(12) United States Patent
Amatsutsu

(10) Patent No.: US 6,338,507 B1
(45) Date of Patent: Jan. 15, 2002

(54) SYNTHETIC RESIN PIPE WITH JOINT

(75) Inventor: Hiroyuki Amatsutsu, Osaka (JP)

(73) Assignee: Totaku Industries, Inc., Takatsuki (JP)

( * ) Notice: Subject to any disclaimer, the term of this patent is extended or adjusted under 35 U.S.C. 154(b) by 0 days.

(21) Appl. No.: 09/405,223

(22) Filed: Sep. 27, 1999

(30) Foreign Application Priority Data

Sep. 25, 1998 (JP) .......................................... 10-288789

(51) Int. Cl.$^7$ ................................................ F16L 39/00
(52) U.S. Cl. ........................ 285/321; 285/305; 285/367; 285/110; 285/902; 285/903; 285/388; 277/648; 138/121
(58) Field of Search ................................ 285/321, 305, 285/110, 367, 10, 902, 903, 388; 138/121; 277/648

(56) References Cited

U.S. PATENT DOCUMENTS

| | | | | |
|---|---|---|---|---|
| 1,016,620 A | * | 2/1912 | Gapp | 285/388 |
| 1,034,781 A | * | 8/1912 | Gapp | 285/388 |
| 1,771,949 A | * | 7/1930 | Blanchard | 285/276 |
| 2,260,712 A | * | 10/1941 | Harrison | 285/321 |
| 3,304,104 A | * | 2/1967 | Wiltse | 285/5 |
| 3,503,636 A | * | 3/1970 | Bower | 285/305 |
| 4,007,953 A | * | 2/1977 | Powell | 285/321 |
| 4,372,529 A | * | 2/1983 | Kato | 251/151 |
| 4,913,473 A | * | 4/1990 | Bonnema et al. | 285/423 |
| 5,435,605 A | * | 7/1995 | Koumatsu et al. | 285/110 |
| 5,498,042 A | | 3/1996 | Dole | |
| 5,799,703 A | * | 9/1998 | Kanao et al. | 138/121 |
| 5,832,960 A | * | 11/1998 | Amatsutsu et al. | 138/110 |
| 5,950,369 A | * | 9/1999 | Amatsutsu et al. | 52/20 |

FOREIGN PATENT DOCUMENTS

| | | |
|---|---|---|
| DE | 195 10714 C1 | 3/1996 |
| EP | 0 670 449 B1 | 12/1999 |
| JP | 11-037366 A | 2/1999 |
| JP | 11-132378 A | 5/1999 |
| JP | 11-257562 A | 9/1999 |

OTHER PUBLICATIONS

Singapore Office Action dated May 25, 2001 and Australian Search Report dated Apr. 5, 2001.

* cited by examiner

Primary Examiner—Lynne H. Browne
Assistant Examiner—Carlos Lugo
(74) Attorney, Agent, or Firm—McGinn & Gibb, PLLC

(57) ABSTRACT

A synthetic resin pipe with a joint, includes a first pipe end portion to be connected, having an open guide cylinder, a large-diameter cylindrical portion formed in a deep portion thereof continuous with the open guide cylinder and having a diameter larger than front and rear walls extending in an axial direction of the synthetic resin pipe, and an outwardly facing projection disposed in a portion of the large-diameter cylindrical portion. A separately produced engaging ring including an inclined guide surface, having a large inside diameter on a width-direction one end face side thereof and having a small inside diameter on a deep side thereof, the engaging ring further including a securing stepped portion formed on the deep side thereof, a plurality of cut-out portions, respectively formed by cutting out the inclined surface, and a projection projecting from a portion of the outer peripheral surface of the engaging ring. A second pipe end portion is included to be connected, including an inclined cylinder larger in diameter on the deep side thereof than on an end face thereof, a securing stepped portion formed on a rear surface of the inclined cylinder, and a plurality of projecting portions provided at peripheral-direction positions of a rear portion of the inclined cylinder that correspond to the cut-out portions of the ring. The engaging ring is inserted into an inside portion of the large-diameter cylindrical portion of the first pipe end portion such that the large-diameter side end face of the inclined guide surface is situated on an entrance side of the ring and the projection on the outer peripheral surface of the ring is fitted with the inner surface recessed portion of the outwardly facing projection of the large-diameter cylindrical portion.

20 Claims, 6 Drawing Sheets

SYNTHETIC RESIN PIPE WITH JOINT

BACKGROUND OF THE INVENTION

1. Field of the Invention

The present invention relates to a synthetic resin pipe including, in two pipe end portions thereof, a joint for connecting the synthetic resin pipe to another synthetic resin pipe.

2. Description of the Related Art

Conventionally, there is a well known pipe structure in which a separately produced pipe joint is united integrally with a pipe end portion of a synthetic resin pipe.

For example, there exists a synthetic resin pipe with a joint member which can be produced in the following manner. Firstly, over the outer peripheral surface of the pipe end portion of a synthetic resin pipe a half section of a cylindrical-shaped joint member is fitted. The joint member has an inner peripheral surface formed with a shape identical to that of an outer peripheral surface of a synthetic resin pipe end portion.

The pipe end portion and the joint member are joined together with adhesives, or, a liquid-state monomer, which can be polymerized and hardened quickly at room temperature. The adhesive is inserted into a clearance between the joint member and the pipe end portion and hardens to connect the joint member and pipe end portion together to form a synthetic resin pipe with an integrally formed joint member.

However, the above-mentioned conventional method for connecting a separately produced joint member to the end portion of a synthetic resin pipe is problematic and difficult.

Additionally, the outer peripheral surface of the pipe end portion of the synthetic resin pipe is not always identical with the inner peripheral surface of the joint member. In many cases, molding gaps can be present between the inner and outer peripheral surfaces. In such cases, it is difficult to join the surfaces together in a manner such that a watertight condition can be maintained.

SUMMARY OF THE INVENTION

In view of the foregoing and other problems, disadvantages, and drawbacks of the conventional synthetic resin pipes with joints, the present invention has been devised, and it is an object of the invention to provide a structure for eliminating the drawbacks found in the above-mentioned conventional synthetic resin pipe with a joint.

In order to attain the above and other objects, a synthetic resin pipe with a joint is provided such that a given joint portion is formed integrally with a synthetic resin pipe at the time the synthetic resin pipe is molded, thereby eliminating the need to connect a separately formed joint to the pipe end portion of the synthetic resin pipe after the synthetic resin pipe is molded. Further, when connecting together two synthetic resin pipes of this type, the other synthetic resin pipe may be simply inserted into one synthetic resin pipe, i.e., their mutual connection can be completed with a very simple one touch operation.

In attaining the above and other objects, according to the invention, there is provided in a first aspect a synthetic resin pipe with a joint, including a pipe end portion Pa to be connected including an open guide cylinder 11 (e.g., see FIGS. 1–6 for exemplary non-limiting embodiments), a large-diameter cylindrical portion 12 formed in a deep portion thereof continuous with the open guide cylinder 11 and having a diameter larger than front and rear walls extending in the axial direction of the pipe, and an outwardly facing projection 14 disposed in a portion of the large-diameter cylindrical portion 12.

Further included is a separately produced engaging ring R having a non-annular or substantially C-like shape when viewed from the side surface. The engaging ring R includes an inclined guide surface 31 having a large inside diameter in the width-direction on a side end face 31a and having a small inside diameter on a deep side. The engaging ring R further includes a securing stepped portion 32 formed on the deep side, a plurality of cut-out portions 33, formed by cutting out the inclined surface 31, and a projection 34 projecting from a portion of the outer peripheral surface of the engaging ring R.

Another pipe end portion Pb to be connected includes an inclined cylinder 21 with a diameter larger on the deep side than on the end face, a securing stepped portion 22 formed on the rear surface of the inclined cylinder 21, and a plurality of projecting portions 23, provided at the peripheral-direction positions of the rear portion of the inclined cylinder 21 that correspond to the cut-out portions 33, of the ring R.

The engaging ring R is inserted into the inside portion 13 of the large-diameter cylindrical portion 12 of one pipe end portion Pa such that the large-diameter side end face 31a of the inclined guide surface 31 is situated on the entrance side of the pipe end portion Pa and also such that the projection 34 on the outer peripheral surface of the ring R is fitted with the inner surface recessed portion of the outwardly facing projection 14 of the large-diameter cylindrical portion 12.

In providing the above-structure of the invention, the other pipe end portion Pb may include, on the deep side of the portion where the projecting portion 23 is provided, a waterproofing ring 25 which can tightly contact the inner peripheral surface of the open guide cylinder 11 formed in one pipe end portion Pa.

Alternatively, the outer peripheral surface of the deep-side cylindrical portion of the other pipe end portion Pb where the projecting portion 23 is provided may be formed substantially equal in diameter to the inner peripheral surface of the open guide cylinder 11 provided in one pipe end portion Pa, and annular recessed grooves 26 may be formed in the outer peripheral surface of the present deep-side cylindrical portion for fitting waterproofing rings 25.

One or both of the cut-out portions 33 of the ring R and the projecting portions 23 of the other pipe end portion Pb may be formed to include, in the circumferential direction of the ring (R) or the other pipe end portion Pb, the inclined surfaces 23a, 33a for allowing their opposite connecting partners to slide together easily.

In addition, the synthetic resin pipe according to the invention may have a smooth outer shape or an unevenly corrugated outer shape. When the synthetic resin pipe has an unevenly corrugated outer shape, the corrugated shape may be spiral or annular. Further, regarding the corrugated shape of the unevenly corrugated synthetic resin pipe, the raised and recessed portions both may be round, or alternatively, the raised portions may be angular and the recessed portions may be round.

In a connection of respective pipe end portions, (e.g., two synthetic resin pipes of this type), the pipe end portion Pb of one synthetic resin pipe may be simply inserted into the pipe end portion Pa of another synthetic resin pipe in the pipe's axial direction.

In this insertion operation, the other pipe end portion Pb contacts the inclined guide surface 31 of the ring R through the inclined cylinder 21 formed in the leading end portion. The other pipe end portion Pb moves into the deep portion of one pipe end portion Pa while spreading the inclined guide surface 31 in the peripheral direction of the ring R.

When the securing stepped portion 22 of the other pipe end portion Pb passes through the inclined guide surface 31, the spreading force in the peripheral direction is halted with a snap, thereby returning the ring R to its original state and signaling the end of the inserting operation with a snapping sound.

Thus, the securing stepped portion 22 of the other pipe end portion Pb is engaged with the securing stepped portion 32 formed on the deep side of the inclined guide surface 31 of the ring R. This prevents the other pipe end portion Pb from moving in a reverse direction and disconnecting.

At this point, the plurality of projecting portions 23 of the other pipe end portion Pb are fitted into the plurality of cut-out portions 33 of the ring R, thereby preventing the other pipe end portion Pb from moving in the peripheral direction.

Thus, to connect together the respective pipe end portions of the two synthetic resin pipes according to the invention, a synthetic resin pipe may be simply inserted into another synthetic resin pipe in the pipe's axial direction. That is, the mutual connection between the two synthetic resin pipes can be completed with a very simple one-touch operation.

To disconnect the mutual connection between the two synthetic resin pipes, if the pipe end portion Pb of the other synthetic resin pipe is rotated in the peripheral direction with respect to the pipe end portion Pa of one synthetic resin pipe, then the projecting portions 23 of the other pipe end portion Pb fitted to the cut-out portions 33 of the ring R are rotated, thereby to produce a rotating force in the peripheral direction. As a result, the other pipe end portion Pb is released from the cut-out portions 33 of the ring R onto the inclined guide surface 31 thereof while increasing the diameter of the ring R. The increased diameter of the ring moves the securing stepped portion 32 of the ring R beyond the diameter of the securing stepped portion 22 on the back surface of the inclined cylinder 21, thereby to remove the mutual engagement between the securing stepped portion 32 and securing stepped portion 22. Thus, in this state, if the other pipe end portion Pb is pulled out from one pipe end portion Pa, then the two pipe end portions Pa and Pb can be disconnected.

Therefore, to disconnect the two synthetic resin pipes, one pipe may be rotated once in the peripheral direction with respect to the other pipe and, subsequently, the one pipe may be extracted from the other pipe in the pipe's axial direction. That is, the mutual connection between the two synthetic resin pipes can be disconnected by a simple two-stage operation.

The present disclosure relates to subject matter contained in Japanese Patent Application No. Hei. 10-288789, filed on Sep. 25, 1998, and which is expressly incorporated herein by reference in its entirety.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS

Figure 1:
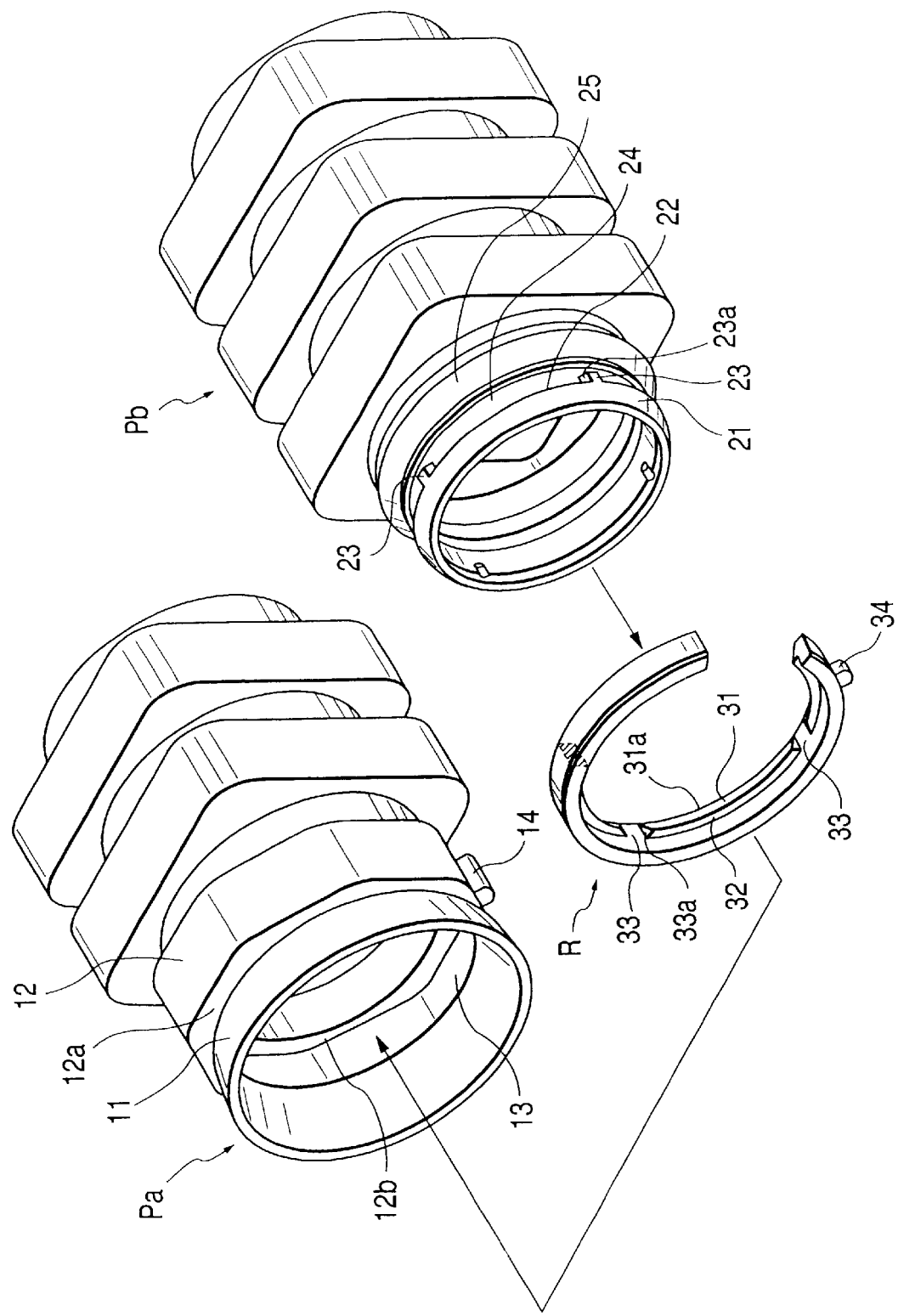
FIG. 1 is a perspective view of the main portions of a synthetic resin pipe with a joint according to a first embodiment of the invention.

Referring now to the drawings, and more particularly to FIGS. 1–6, there are shown preferred embodiments of the method and structures according to the present invention.
First Embodiment
Referring to FIGS. 1–4, showing the structure of the pipe end portion of a synthetic resin pipe, a first embodiment of the present invention will be described below.

Figure 2:
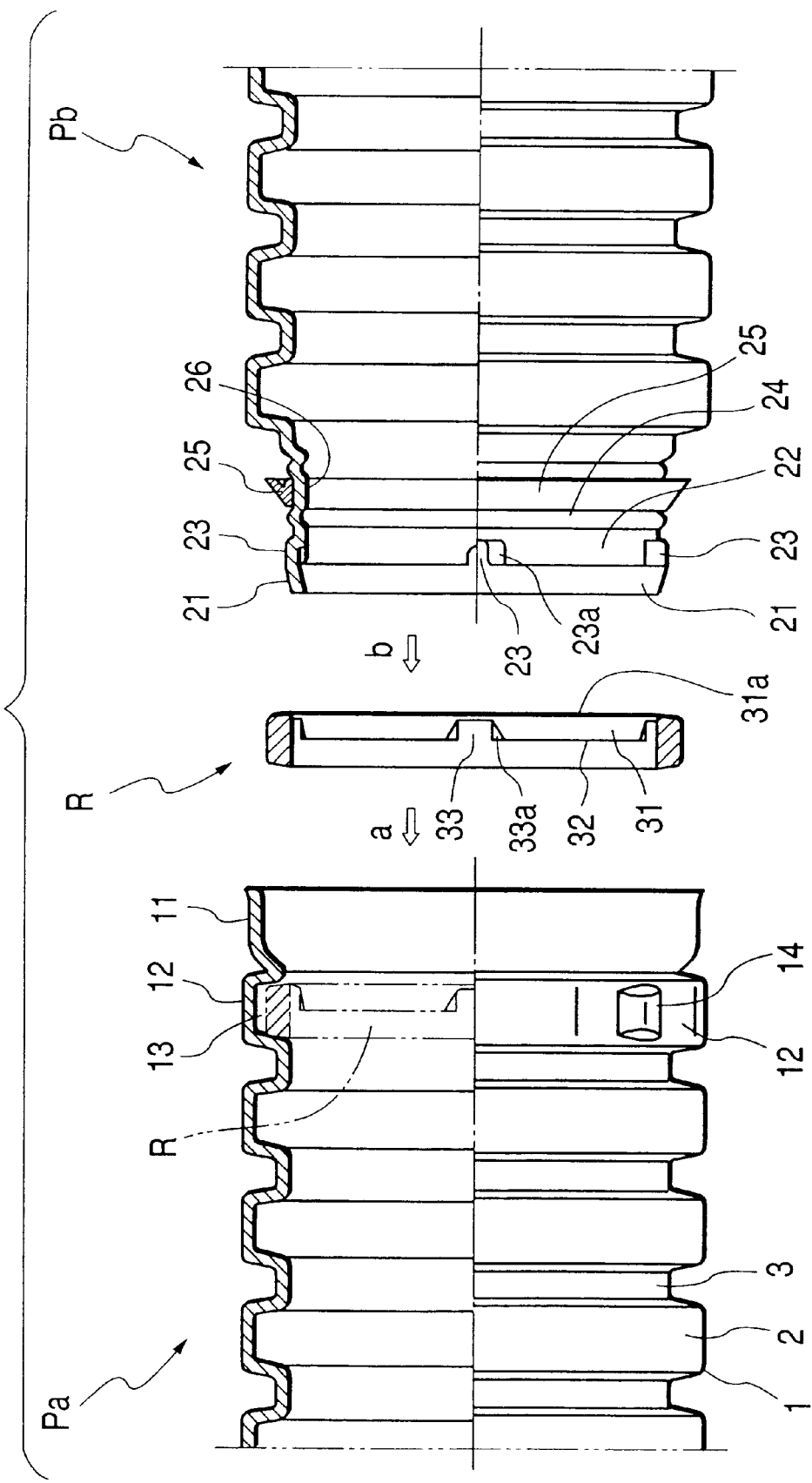
FIG. 2 is a partially longitudinal side view of the main portions of a synthetic resin pipe in a first embodiment of the invention, showing a non-connected state thereof.
Figure 3:
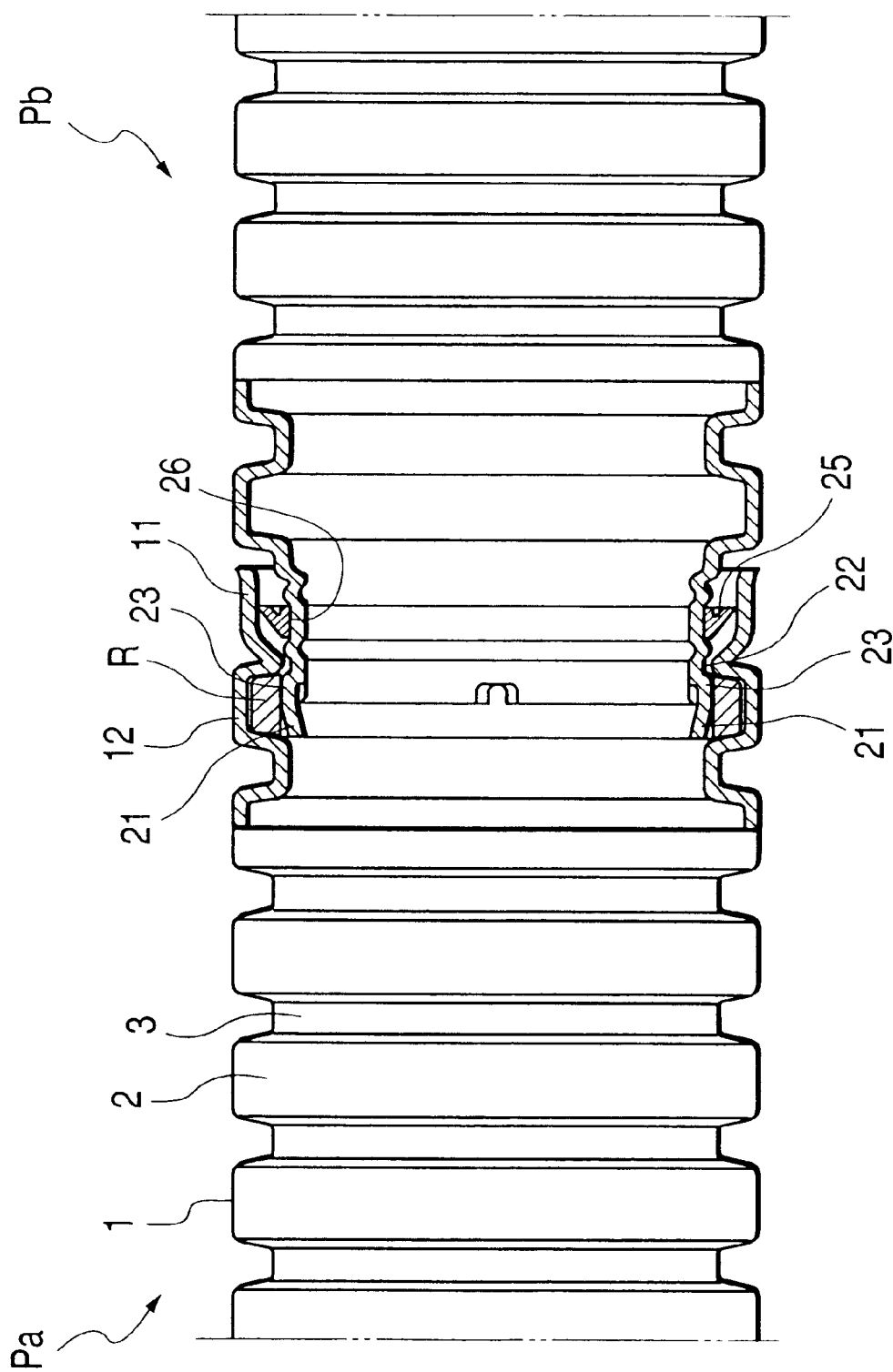
FIG. 3 is a partially longitudinal side view of the main portions of the first embodiment of the invention shown in FIG. 2, showing a connected state thereof.
Figure 4:
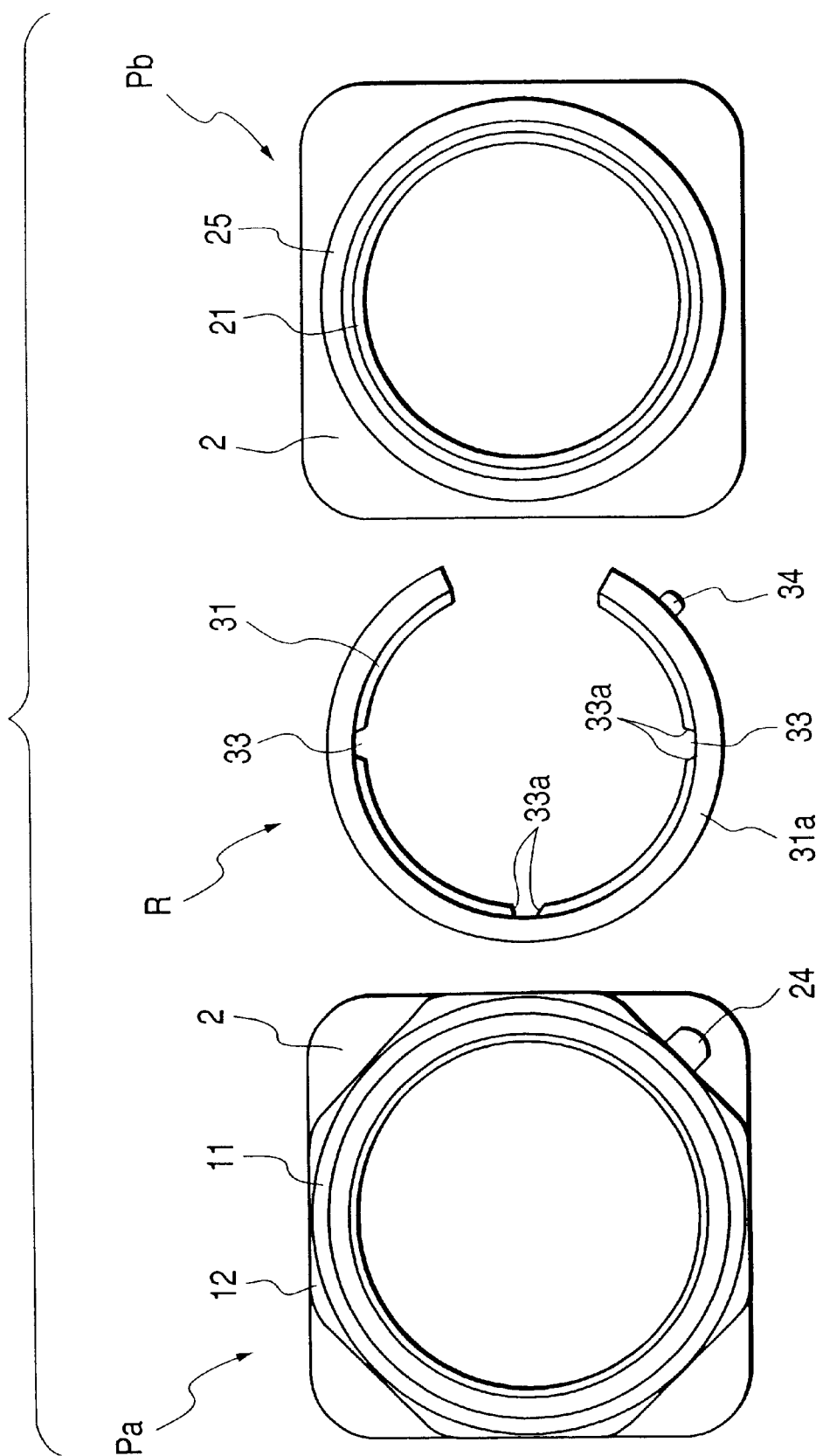
FIG. 4 is a front view of the end face shapes of the above main portions of a synthetic resin pipe in a first embodiment of the invention.

In particular, FIG. 1 is a perspective view of the respective pipe end portions Pa, Pb of two synthetic resin pipes to be connected together and a ring R to be inserted into one pipe end portion. FIG. 2 shows a partially longitudinal side view of the pipe end portions of the two synthetic resin pipes and the ring. FIG. 3 is a partially longitudinal side view of the two synthetic resin pipes, showing a state where they are connected together. FIG. 4 is a view of the end-face side shapes of the two synthetic resin pipes and the ring.

The synthetic resin pipe shown in the first embodiment is a pipe whose pipe wall 1 includes a plurality of large diameter portions 2, each having a square section with corners thereof rounded off, and a plurality of small diameter portions 3, each having a circular section that are alternately arranged along the axial direction of the pipe.

An exemplary synthetic resin pipe includes a main body as well as a pipe end portion which are both formed integrally of a polyolefin system resin such as polyethylene resin (PE), polypropylene resin (PP) or a similar material. Although the pipe material is not limited to a specific material, preferably, the pipe will be formed of a material that is highly resistant to weather conditions.

In the pipe end portion Pa of one of the two synthetic resin pipes to be connected together, and more particularly, in the open end thereof, there is formed an open guide cylinder 11 which has an outwardly opening conical shape. In the deep portion of the pipe end portion Pa, formed continuously with the open guide cylinder 11, a large-diameter cylindrical portion 12 is formed having an octagonal-shaped section and also having a diameter larger than front and rear walls, 12a and 12b, respectively extending in the axial direction of the pipe. Additionally, as shown in FIG. 1, on a portion of the large diameter cylindrical portion 12 on the lower right side of the large diameter cylindrical portion 12, there is a projection 14 which projects outwardly and which includes a recessed portion on its inner surface.

Within the inside portion 13 of the large-diameter cylindrical portion 12, an engaging ring R, which is produced separately, is inserted. The ring R, when it is viewed from the side surface, is substantially C-shaped (e.g., not a completely annular shape because it is broken away in part)

. Also, the ring R includes an inclined guide surface 31 extending up to the middle position of the ring R in the direction of the width. The ring R also includes a non-inclined large-diameter cylindrical portion located on the deep side of the inclined guide surface 31, and a securing stepped portion 32 formed on the deep side of the inclined guide surface 31.

The inclined guide surface 31 is structured such that the inside diameter of end face 31a is a large diameter, whereas the deeper side has a smaller diameter. Also, in the quadrisected portions of the inclined surface 31, in the peripheral direction, there are formed cut-out portions 33.

On a portion of the outer peripheral surface of the ring R, there is a projection 34 which fits into the inner surface side recessed portion of the projection 14 that is provided on one pipe end portion Pa. Further, each of the cut-out portions 33, includes two inclined surfaces 33a, as shown in FIG. 4, respectively forming the two sides thereof in the peripheral direction of the ring R. The two inclined surfaces 33a make it easy for projecting portions 23 formed on the other pipe end portion Pb to move up the inclined guide surface 31, when the other pipe end portion Pb is rotated in the peripheral direction with respect to one pipe end portion Pa.

The projection 34 may also be located at a lower left position across from the current lower right position of the projection 34, as illustrated in FIG. 1. Further, the projection 34 may be disposed at any position in the peripheral direction of the ring R and there may be more than one projection 34.

Regarding the structure of the pipe end portion Pb of the other pipe to be connected, in the pipe end, there is formed an inclined cylinder 21 which is larger in diameter on the deep side thereof than on the end face side. The rear side of the inclined cylinder 21 is formed as a cylindrical-shaped portion 24 having a smaller diameter. The rear surface of the inclined cylinder 21 includes a securing stepped portion 22 which can be engaged with the securing stepped portion 32 of the ring R. Within the rear portion of the inclined cylinder 21, there are disposed projecting portions 23, located at positions in the peripheral direction corresponding to the cut-out portions 33 of the ring R.

Also, the rear of the small-diameter cylindrical-shaped portion 24, includes two front and rear annular ribs. Between the two annular ribs, an annular recessed groove 26 is formed, into which is fitted a waterproofing ring 25 which increases in diameter toward its rearward end. The waterproofing ring 25 includes an inclined outer peripheral surface, and the outer peripheral diameter of the waterproofing ring 25 is such that the outer peripheral surface of the waterproofing ring 25 can be tightly fitted against the inner peripheral surface of the open guide cylinder 11 of one pipe end portion Pa.

Additionally, regarding the shapes of the projecting portions 23, each of them may include two inclined surfaces 23a respectively formed on the two sides thereof in the peripheral direction of the inclined cylinder 21 (e.g., see FIG. 1), similar to the inclined surfaces 33a formed on the cut-out portions 33 of the ring R. Inclined surfaces such as these may be formed on either the cut-out portions 33 of the ring R or on the projecting portions 23 of the inclined cylinder 21.

Further, prior to connecting the two pipe end portions Pa and Pb, the engaging ring R having the above-mentioned structure, as shown by an arrow a and an imaginary line in FIG. 2, is inserted into the inside portion 13 of the large-diameter cylindrical portion 12 of one pipe end portion Pa. In this manner the large-diameter side end face 31a of the inclined guide surface 31 is situated on the entrance side of the pipe end portion Pa and also the projection 34 disposed on the outer peripheral surface of the ring R is fitted with the inner surface recessed portion of the outwardly facing projection 14 of the large-diameter cylindrical portion 12.

Therefore, with the two synthetic resin pipes, thus structured in a connecting operation, if the other pipe end portion Pb is simply inserted into one pipe end portion Pa in the axial direction of the pipe (e.g., as shown by an arrow b in FIG. 2), then the two pipe end portions Pa and Pb can be connected such that they are prevented from disconnecting and from moving in a circumferential direction thereof.

To disconnect the two pipe end portions Pa and Pb, the other pipe end portion Pb may be rotated once in the circumferential direction thereof with respect to one pipe end portion Pa. After rotating the other pipe end portion Pb, portion Pb can be extracted from pipe end portion Pa in the axial direction of the pipe, thereby completing a disconnecting operation.

In connecting together the pipe end portions Pa and Pb, when the securing stepped portion 22 of the insertion-side pipe end portion Pb passes through the inclined guide surface 31 of the ring R, the ring R returns to its original state and emits a snapping sound. The snapping sound signals the completion of the insertion operation and that the two pipe end portions Pa and Pb are connected.

The above-described structure of the first embodiment of the present invention provides the advantage that a connection between two synthetic resin pipes can be achieved safely and positively.

Second Embodiment

Figure 5:
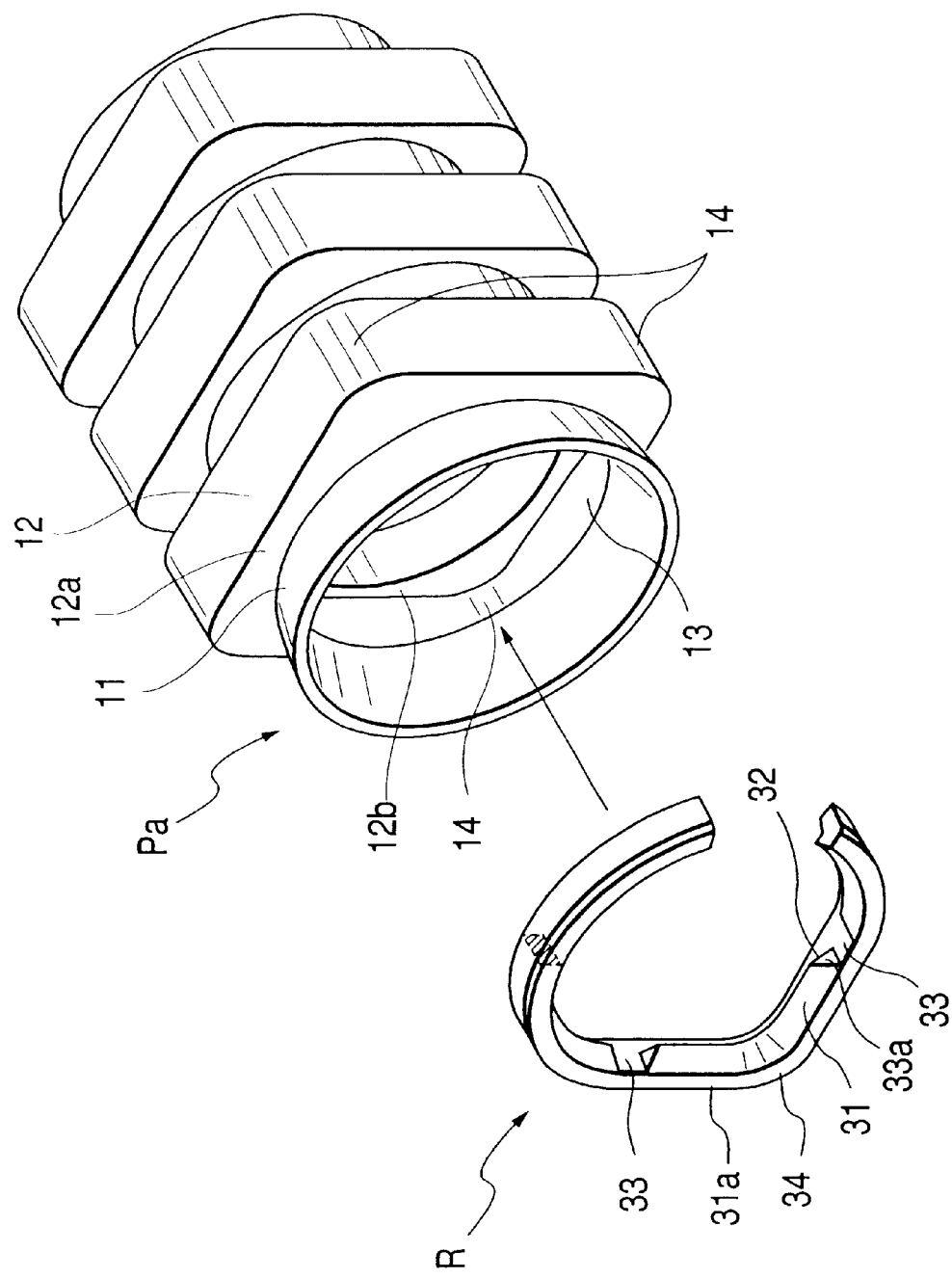
FIG. 5 is a perspective view of the main portions of a synthetic resin pipe with a joint according to a second embodiment of the invention.

FIG. 5 is a perspective view of a ring R and the large-diameter cylindrical portion 12 of one pipe end portion Pa which are respectively the main portions of a second embodiment of a synthetic resin pipe according to the present invention.

In the second embodiment, the large-diameter cylindrical portion 12 of the pipe end portion Pa is formed so as to have a substantially square-shaped section. The four corner portions of the large-diameter cylindrical portion 12 are formed as projections which respectively correspond to the outwardly facing projection 14 employed in the previously described first embodiment.

The ring R includes a projecting portion 34 having substantially the same shape as the inner surface of each of the outwardly projecting corner portions of the large-diameter cylindrical portion 12. The projecting portion 34 is located on the inside portion of any one of the corner portions of the large-diameter cylindrical portion 12. With this structure, the substantially square-shaped large-diameter cylindrical portion 12 according to the second embodiment can be substituted for the large-diameter cylindrical portion 12 including the substantially octagonal-shaped outward facing projection 14 of the first embodiment.

Further, the large-diameter cylindrical portion 12 including the substantially octagonal-shaped outward facing projection 14 according to the first embodiment can also be formed as a simple large-diameter cylindrical portion.

Third Embodiment

Figure 6:
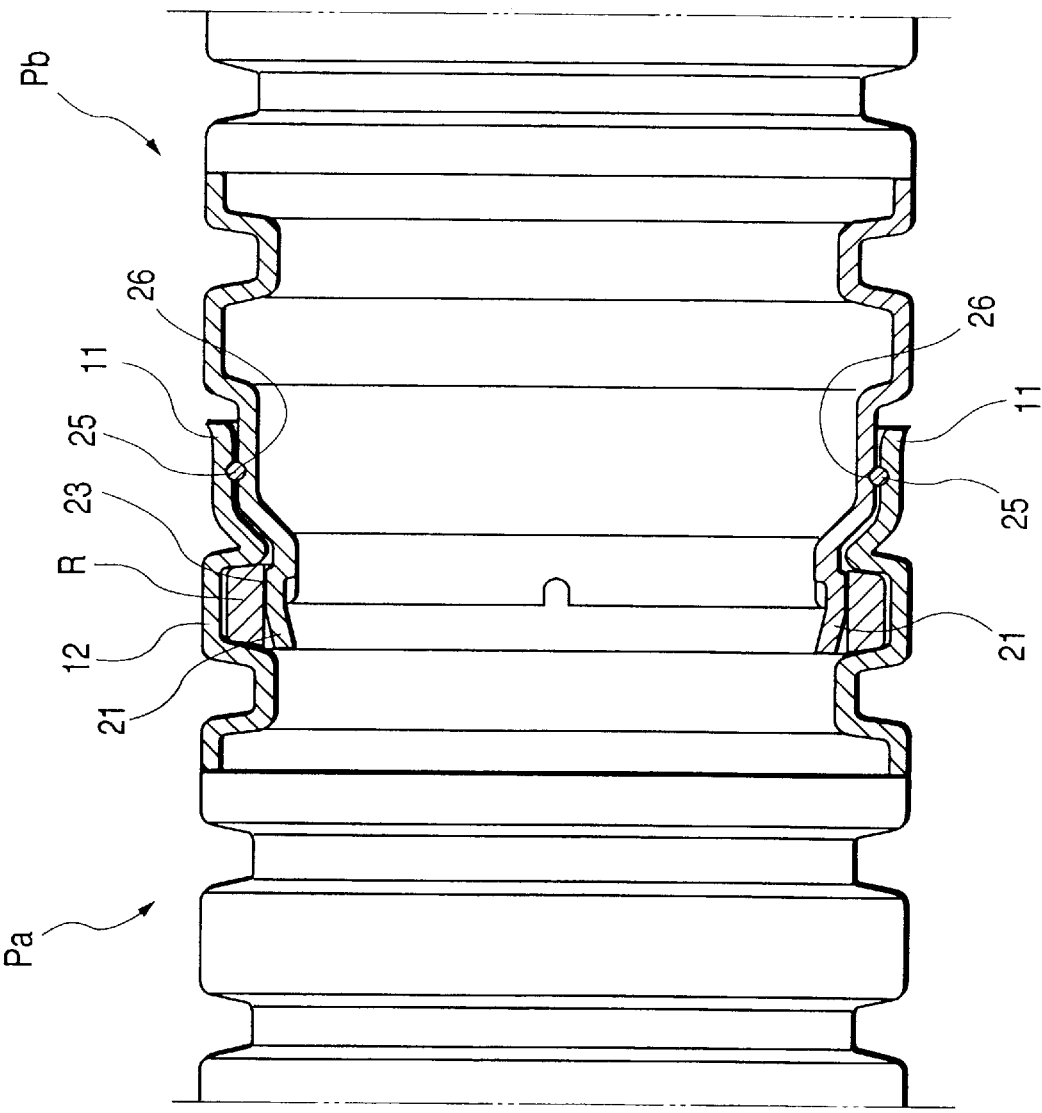
FIG. 6 is a partially longitudinal side view of the main portions of a synthetic resin pipe in a third embodiment, showing a connected state thereof.

FIG. 6 shows a ring R and the pipe end portions Pa and Pb of two synthetic resin pipes according to a third embodiment of the invention. In the third embodiment, the outer peripheral surface of the deep-side cylindrical portion of a pipe end portion Pb, where the projecting portion 23 is provided, is formed substantially equal in diameter to the inner peripheral surface of the open guide cylinder 11 provided in pipe end portion Pa. Annular, recessed grooves 26 are formed in the outer peripheral surface of the deep-side cylindrical portion. Waterproofing rings 25 are respectively fitted into the annular recessed grooves 26. Using this structure, the two synthetic resin pipes can be securely connected in a watertight manner.

With the above-described unique and unobvious features of the present invention, many configurations are made possible. For example, according to one aspect of the invention, a synthetic resin pipe with a joint may have one pipe end portion Pa on one end side and another pipe end portion Pb on the other end side. Also, according to another aspect of the invention, one synthetic resin pipe with a joint may have one pipe end portion Pa on each end side, while the other synthetic resin pipe with a joint may have the other pipe end portion Pb on each end side.

Although the preferred embodiments of the invention have been described heretofore, the present invention is not limited to them. There are also various other possible changes and modifications that can meet the above-mentioned essential requirements of the invention, achieve the above-mentioned objects and can provide the following effects.

For example, in the illustrated embodiments, the inclined surface 31 is formed substantially along one half of the width of the ring R. However, the inclined surface 31 can also be formed along the entire width of the ring R toward the deep end side, and the end face of the deep side can be used as the securing stepped portion 32.

As clear from above, a synthetic resin pipe with a joint having the structure described above according to the invention and in which a simple operation that the ring R has been inserted into the large-diameter cylindrical portion of one pipe end portion in a simple operation can connect together two synthetic resin pipes of this type. The other pipe may be simply inserted into one pipe in the pipe's axial direction, thereby completing the connection of the two pipes with a very simple one-touch operation.

Further, to disconnect the two pipes, the pipe end portion of the other pipe may be rotated once peripherally with respect to the pipe end portion of one pipe and, subsequently, the other pipe may be extracted from one pipe in the pipe axial direction. Thus, disconnecting the two pipes can be accomplished in a simple two-stage operation (e.g., rotating a pipe and extracting). Thus, the present invention provides many advantages over the conventional structures.

Further, regarding the synthetic resin pipe with a joint according to the invention, the need to connect a separately produced joint to the pipe end portion of a molded synthetic resin pipe is eliminated. A joint portion is formed integrally with a synthetic resin pipe simultaneously with the molding of the synthetic resin pipe, thereby eliminating mounting a joint onto the end portion of a synthetic resin pipe. Thus, the watertight condition of the synthetic resin pipe will not be jeopardized by any joint mounting portion. Thus, the present invention keeps the connected portions of the two pipes securely watertight.

While the invention has been described in terms of several preferred embodiments, those skilled in the art will recognize that the invention can be practiced with modification within the spirit and scope of the appended claims.

What is claimed is:

1. A synthetic resin pipe with a joint, comprising:
    a first pipe end portion, including an open guide cylinder, a large-diameter cylindrical portion limitation "formed in a deep portion of the first pipe end portion" continuous with said open guide cylinder and having a diameter larger than front and rear walls extending in an axial direction of said synthetic resin pipe, and an outwardly-facing projection disposed in a portion of said large-diameter cylindrical portion having an inner surface recessed portion;
    a separately produced engaging ring having a non-annular or C cross sectional shape, said engaging ring including an inclined guide surface having a large inside diameter on a width-direction one-end face side of the inclined guide surface and having a small inside diameter on a deep side thereof, said engaging ring further including a securing stepped portion formed on the deep side thereof, a plurality of cut-out portions, respectively formed by cutting out said inclined surface, an outer peripheral surface and a projection projecting from a portion of said engaging ring; and
    a second pipe end portion, including an inclined cylinder larger in diameter on the deep side of the second pipe end portion than on an end face thereof, a securing stepped portion formed on a rear surface of said inclined cylinder, and a plurality of projecting portions respectively provided at peripheral-direction positions of a rear portion of said inclined cylinder that respectively correspond to said cut-out portions of said ring,
    wherein said engaging ring is inserted into an inside portion of said large-diameter cylindrical portion of said first pipe end portion such that said large-diameter side end face of said inclined guide surface is situated on an entrance side of said first pipe end portion and also such that said projection on the outer peripheral surface of said ring is fitted with the inner surface recessed portion of said outwardly facing projection of said large-diameter cylindrical portion.

2. The synthetic resin pipe with a joint as set forth in claim 1, wherein said second pipe end portion includes, on the deep side of the portion thereof where said projecting portion is provided, a waterproofing ring for tightly contacting the inner peripheral surface of said open guide cylinder formed in said first pipe end portion.

3. The synthetic resin pipe with a joint as set forth in claim 1, wherein one of said cut-out portions of said ring and said projecting portions of said second pipe end portion includes, in the circumferential direction of said ring or said second pipe end portion, inclined surfaces for allowing their mating partners to move up thereonto.

4. The synthetic resin pipe with a joint as set forth in claim 1, wherein both of said cut-out portions of said ring and said projecting portions of said second pipe end portion include, in the circumferential direction of said ring or said second pipe end portion, inclined surfaces, for allowing their mating partners to move up thereonto.

5. The synthetic resin pipe with a joint as set forth in claim 2, wherein one of said cut-out portions of said ring and said projecting portions of said second pipe end portion includes, in the circumferential direction of said ring or said second pipe end portion, inclined surfaces, for allowing their mating partners to move up thereonto.

6. The synthetic resin pipe with a joint as set forth in claim 2, wherein both of said cut-out portions of said ring and said projecting portions of said second pipe end portion include, in the circumferential direction of said ring or said second pipe end portion, inclined surfaces, for allowing their mating partners to move up thereonto.

7. The synthetic resin pipe with a joint as set forth in claim 1, wherein the outer peripheral surface of the deep-side cylindrical portion of said second pipe end portion is formed substantially equal in diameter to the inner peripheral surface of the open guide cylinder of said first pipe end portion.

8. The synthetic resin pipe with a joint as set forth in claim 7, further comprising a plurality of annular recessed grooves formed in the outer peripheral surface of the deep-side cylindrical portion of said second pipe end portion and a waterproofing ring received by said plurality of annular recessed grooves.

9. The synthetic resin pipe with a joint as set forth in claim 1, wherein at least one of said first and second pipe end portions has an outer periphery having a substantially round cross-sectional shape.

10. The synthetic resin pipe with a joint as set forth in claim 1, wherein at least one of said first and second pipe end portions has an outer periphery having an unevenly corrugated outer shape.

11. The synthetic resin pipe with a joint as set forth in claim 10, wherein said unevenly corrugated outer shape has a spiral form.

12. The synthetic resin pipe with a joint as set forth in claim 10, wherein said unevenly corrugated outer shape has an annular form.

13. The synthetic resin pipe with a joint as set forth in claim 10, wherein at least one of said first and second pipe end portions has an outer periphery having an unevenly corrugated outer shape including raised and recessed portions having a round shape.

14. The synthetic resin pipe with a joint as claimed in claim 10, wherein at least one of said first and second pipe end portions has an outer periphery having an unevenly corrugated outer shape including raised portions that are angular and recessed portions that have a round shape.

15. The synthetic resin pipe with a joint as claimed in claim 1, further comprising a pipe wall, coupled to one of said first and second pipe end portions, which comprises a plurality of large diameter portions, each having a square cross-section with corners rounded off, and a plurality of small diameter portions, each having a circular cross-section, that are alternately arranged along the axial direction of the pipe.

16. The synthetic resin pipe with a joint as claimed in claim 1, further comprising a main body, coupled to one of said first and second pipe end portions, said main body and said first and second pipe end portions being formed integrally of a polyolefin system resin.

17. The synthetic resin pipe with a joint as claimed in claim 16, wherein said polyolefin system resin comprises at least one of polyethylene resin (PE) and polypropylene resin (PP).

18. A pipe with a joint, comprising:
a first pipe end portion including an open guide cylinder, a large-diameter cylindrical portion formed on the deep side of the first pipe end portion continuous with said open guide cylinder and having a diameter larger than front and rear walls extending in an axial direction of said pipe, and an outwardly facing projection disposed in a portion of said large-diameter cylindrical portion;
a separately produced engaging ring including:
an inclined guide surface having a large inside diameter on a width-direction one-end face side of the inclined guide surface and having a small inside diameter on the deep side of the inclined guide surface;
a securing stepped portion formed on the deep side thereof;
a plurality of cut-out portions, respectively formed in said inclined surface; and
a projection projecting from a portion of the outer peripheral surface of said engaging ring.

19. The pipe with a joint as claimed in claim 18, further comprising:
a second pipe end portion; including:
an inclined cylinder larger in diameter on the deep side thereof than on an end face thereof;
a securing stepped portion formed on a rear surface of said inclined cylinder; and
a plurality of projecting portions respectively provided at peripheral-direction positions of a rear portion of said inclined cylinder that respectively correspond to said cut-out portions of said ring.

20. The pipe with a joint as claimed in claim 19, wherein said first pipe end portion, said engaging ring, and said second pipe end portion are formed of synthetic resin, and
wherein said engaging ring is inserted into an inside portion of said large-diameter cylindrical portion of said first pipe end portion such that said large-diameter side end face of said inclined guide surface is situated on an entrance side of said first pipe end portion and also such that said projection on the outer peripheral surface of said ring is fitted with the inner surface recessed portion of said outwardly facing projection of said large-diameter cylindrical portion.

* * * * *